United States Patent [19]
Griswold

[11] 3,764,903
[45] Oct. 9, 1973

[54] PHASE MEASURING SYSTEM
[75] Inventor: Frederick Bethel Griswold, Roosevelt, N.J.
[73] Assignee: RCA Corporation, New York, N.Y.
[22] Filed: Aug. 7, 1972
[21] Appl. No.: 278,266

[52] U.S. Cl.............................................. 324/83 D
[51] Int. Cl. ...................... G01r 25/00, H03d 13/00
[58] Field of Search....................... 324/83 R, 83 D

[56] References Cited
UNITED STATES PATENTS
3,381,220  4/1968  Burr................................. 324/83 D
3,386,096  5/1968  Lundgreen et al............ 324/83 D X

*Primary Examiner*—Alfred E. Smith
*Attorney*—Edward J. Norton et al.

[57] ABSTRACT

A phase measuring system includes apparatus for measuring the difference in phase between a periodic input signal and a reference signal while using the same reference signal as a clock whose periods are counted as a measure of the difference in phase between the reference signal and the input signal. This is accomplished by first multiplying the phase of the input signal and then dividing its frequency and phase by a given amount and comparing this divided signal with the reference signal whose frequency and phase is also divided by the same amount. The two divided signals serve to respectively enable and disable a gate which passes the reference signal to a counter whose count manifests the phase difference between the two signals being compared.

10 Claims, 1 Drawing Figure

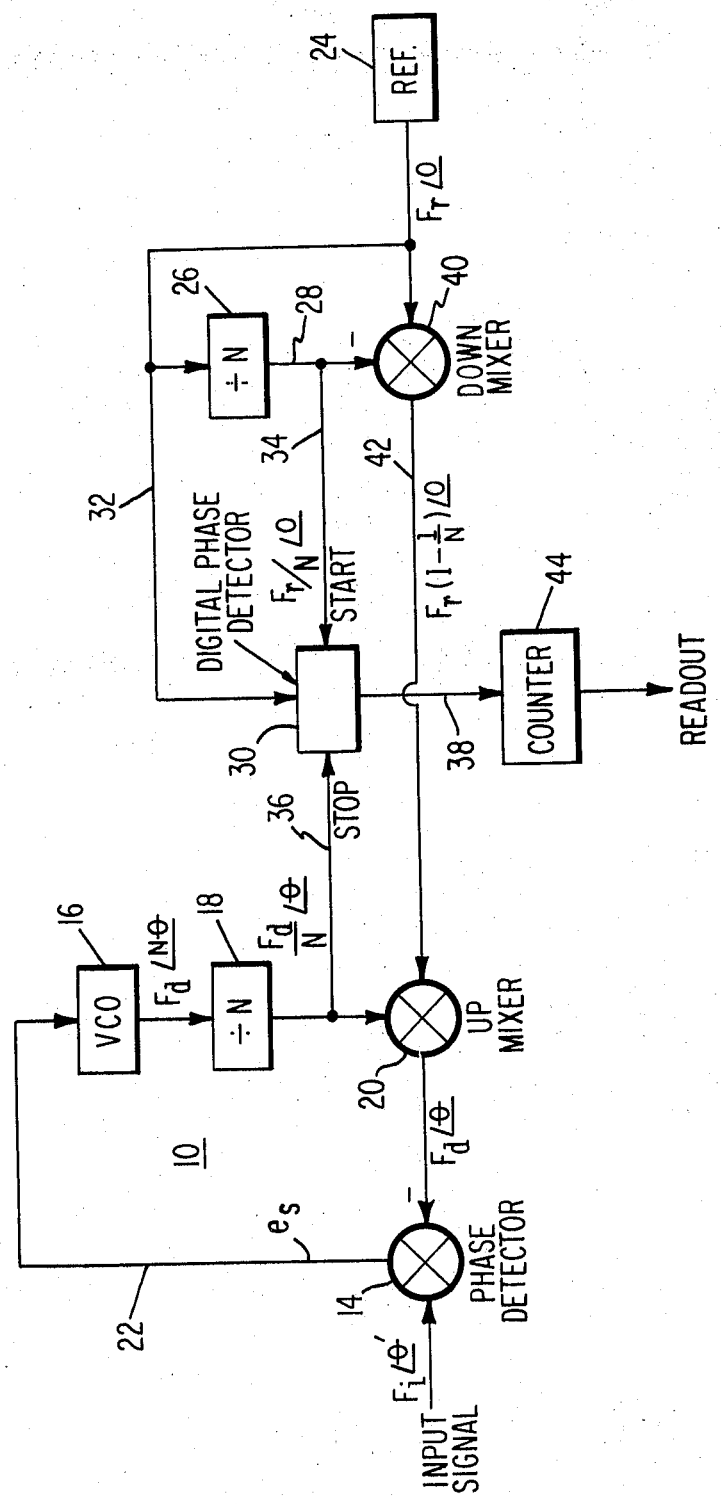

PHASE MEASURING SYSTEM

The invention herein described was made in the course of or under a contract or subcontract thereunder with the Department of the Navy.

This invention relates to phase measuring systems. There are many different ways for measuring the phase between two like frequency waves. One widely used system utilizes a digital phase detector which is enabled by a reference signal and is disabled by an input signal, the detector measuring the phase difference between the two signals. When the detector is enabled, a clock signal is passed to a counter which counts the pulses of the clock that are passed in the interval between the enabling and disabling of the detector. This count manifests the phase difference.

In practice, to obtain an accuracy in a digital meter by a factor of N, the clock rate must also be increased by a factor of N over the rate of the reference signal. However, logic speed limitations are ultimately reached when upper frequency ranges are utilized such as in the megaHertz range. For example, assume it is desired to measure the phase shift of a 10 megaHertz signal to an accuracy of 1 nanosecond. Further assume that the 10 megaHertz signal is changing phase in an unknown manner at a rate that would make significant errors during N period averaging. Instantaneous phase measurement therefore would be applicable. To do this conventionally a 1 gigaHertz clock would be required. The present state of the art logic is such that utilization of such a clock is not practical.

A typical application employing phase measuring devices requiring such a high degree of accuracy is in range tone systems utilizing earth orbiting satellites which emit a series of range tones varying in frequency from 100 Hertz to 10 megaHertz. One such system is described in a copending application entitled Rate Aided Ranging and Time Dissemination Receiver invented by Buntschuh et al., Ser. No. 208,762, filed Dec. 16, 1971, and assigned to the assignee of the present invention. In particular, the phase meter of the present invention may be used in conjunction with a phase tracking system disclosed in my copending application entitled Analog Phase Tracker, Ser. No. 278,289 filed Aug. 7, 1972 and assigned to the same assignee of the present invention. The receiving station is a moving target which must identify its location precisely to within one per cent of the period of the highest frequency range tone. Such precision is beyond the capability of present phase measuring devices.

SUMMARY OF THE INVENTION

In accordance with the present invention, an apparatus for measuring the difference in phase between an input signal and a reference signal includes means for expanding the phase of the input signal by a given amount. Means are coupled to the expanding means for altering the frequency and phase of the expanded input signal by dividing the expanded signal by the given amount for generating a first divided signal. Means are provided for altering the phase and frequency of the reference signal applied as an input thereto by dividing the reference signal by the given amount for generating a second divided signal. Phase measuring means are provided which are responsive to the first and second divided signals and the reference signal applied as inputs thereto for generating an output signal manifesting the difference in phase between the first and second divided signals. The difference in phase between the first and second divided signals manifests a difference in phase between the input signal and the reference signal.

In the drawing the sole FIGURE illustrates a block schematic representation of an apparatus constructed in accordance with the present invention.

DETAILED DESCRIPTION

In the drawing phase lock loop 10 comprises a phase detector 14, voltage controlled oscillator 16, a divide by N divider 18 and an up mixer 20. Input signal $F_i \angle \theta'$ is applied as one input to phase detector 14 which generates an error signal $e_s$ on lead 22 which is proportional to the difference in phase between the applied input signal and a signal $F_d \angle \theta$ derived by loop 10. Signal $F_d \angle \theta$ is derived by loop 10 such that the phase and frequency of the derived signal tracks the phase and frequency of the input signal applied to phase detector 14. The output of the voltage control oscillator, hereinafter VCO 16 is a signal $F_d \angle N\theta$ whose frequency is substantially the same as the frequency of the input signal $F_i \angle \theta'$ whose phase is N times the phase of the input signal phase. Voltage control oscillator 16 output is applied to divider 18 which divides both the frequency and the phase of the VCO output by an amount N. The output of the divider is a signal $F_d/N \angle \theta$ whose frequency is $f_d/N$ and whose phase is $\theta$. Divider 18 output signal is applied as an input to up mixer 20 which mixes the divider 18 output with a second input $F_r(1 - 1/N) \angle 0$ which, when added together, generate a beat signal $F_d \angle \theta$ whose frequency and phase substantially match that of the input signal $F_i \angle \theta'$. Error signal $e_s$ controls the tracking of $F_d \angle \theta$ with $F_i \angle \theta'$ and minimizes tracking error $\theta' - \theta$.

It will be appreciated that up mixer 20 serves to multiply its input signals with the net effect of adding and subtracting the input frequencies and phases with no effect on the phase of the input signals. Thus, in effect, the phase of the signal at the output of up mixer 20 is equal to and varies in phase at the same rate as the phase of the input signal $F_d/N \angle \theta'$, since the other input is at reference with zero phase.

A reference clock 24 generates an output signal $F_r \angle 0$ whose frequency $f_r \angle 0$ is the same as the frequency of the input signal $F_i \angle \theta$ and differing in phase from the input signal by the angle $\theta$. The reference signal $F_r \angle 0$ is applied as an input signal to divide by N divider 26. Divider 26 divides by the same amount as divider 18. The output of divider 26 on lead 28 is applied an an input to digital phase detector 30 on lead 34 while the output of divider 18 is applied as an input to the phase detector 30 on lead 36. Digital phase detector 30 serves as a gate for passing clock pulses on lead 32 to output lead 38 whenever digital phase detector 30 is enabled. The same point on waveform $F_r/N \angle 0$ and waveform signal $F_d/N \angle \theta$ serve to respectively enable and disable phase detector 30. The time interval between like transistions of the reference signal $F_r/N \angle 0$ and of the derived signal $F_d/N \angle \theta$ is the phase difference between the two signals. Since the clock rate of clock 24 on lead 32 is running at N times the rate of the signals being compared on leads 34 and 36, then the resolution will be 1/NF and the count for the phase difference will be $\tau NF$ where $\tau$ is the phase difference time interval.

To provide the second input to up mixer 20 to generate the derived signal $F_d \angle \theta$, the divider 28 output is applied as a first input signal and clock 24 output is applied as a second input signal to down mixer 40. The output of down mixer 40 on lead 42 is a signal at a phase angle 0 since the mixer, as indicated above, does not change the phase of the input signals and has a frequency of $f_r(1-1/N)$. The down mixed signal, when added to the derived signal $F_d/N \angle \theta$ by mixer 20 produces at the output of mixer 20 the signal $F_d \angle \theta$.

The output of digital phase detector 30 is then applied as an input to the counter 44 which counts the pulses passed thereto by digital phase detector 30.

Factor N may be any amount, but is preferably an integer in the order of 100 wherein the highest frequency of the input signal $F_i \angle \theta'$ is in the order of 10 megaHertz. Ordinarily, the output of clock 24, applied to a digital phase detector such as detector 30, would have to be 100 times the highest frequency of the input signal and would in effect be 1 gigaHertz. The present state of logic is such that signals at such frequencies could not be processed by this logic. By providing the dividing and phase multiplication in accordance with the present invention, a reference clock can serve both as a time interval measuring clock and a phase comparing clock both of which having a frequency within the limitations of state of art components. Detailed circuitry for each of the devices of the apparatus of the present invention are well known and no further description thereof will be provided herein.

The following analysis may prove helpful in further understanding the operation of the phase meter constructed in accordance with the present invention. It can be shown mathematically that the derived waveforms relate as follows:

$$F_d \angle \theta = A_{d1} \cos(\omega_d t + \theta)$$
$$= A_{d1} \cos \omega_d (t + \tau) \quad (1)$$

$$F_d/N \angle \theta = A_{d2} \cos(\omega_d/N \ t + \theta)$$
$$= A_{d2} \cos \omega_d/N \ (t + N\tau) \quad (2)$$

$$F_d \angle N\theta = A_{d3} \cos(\omega_{dt} + N\theta)$$
$$= A_{d3} \cos \omega_d (t + N\tau) \quad (3)$$

where $\tau$ is the time delay of the phase the derived signal $F_d \angle \theta$ with respect to the phase of the reference signal $F_r \angle 0$. From the above equations 1 through 3, it can be seen that time delay $\tau$ passes through divider 18 unchanged and the phase angle $\theta$ passes through up mixer 20 unchanged.

As to down mixer 40, let $F_r \angle 0$ be $F_1 \angle \alpha$, $F_r/N \angle 0$ be $F_2 \angle \beta$, and $F_r(1-1/N) \angle 0$ be $F_3 \angle Y$. Then $$F_3 \angle Y = l_c \cdot F_1 \angle \alpha \cdot F_2 \angle \beta$$
$$= l_c \cdot A_1 \cos(\omega_1 t + \alpha) \cdot A_2 \cos(\omega_2 t + \beta)$$
$$= (l_c \cdot A_1 A_2/2)[\cos(\omega_1 + \omega_2)t + (\alpha + \beta)$$
$$+ \cos(\omega_1 - \omega_2)t + (\alpha - \beta)] \quad (4)$$

where $l_c$ is the loss through the mixer.

The sum or difference is selected by the mixer in accordance with sign adjacent the $F_2 \angle \beta$ term. By placing a minus (−) sign adjacent the $F_2 \angle \beta$ in equation (4), the difference term of $F_3 \angle Y$ is selected and the sum term is rejected, thus:

$$F_3 \angle Y = (l_c A_1 \cdot A_2/2)[\cos(\omega_1 - \omega_2)t + (\alpha - \beta)]$$
$$= A_3[\cos \omega_3 t + Y] \quad (5)$$

If no minus sign is shown then it is understood that the sum term is chosen and the difference term is rejected. For up mixer 20 let $F_1 \angle \alpha$ be $F_d/N \angle \theta$, $F_2 \angle \beta$ be $F_r(1-1/N) \angle 0$ and $F_3 \angle Y$ be $F_d \angle \theta$. Substitute these terms in equation (4) and select the sum term.

For phase detector 14 let $F_1 \angle \alpha$ be $F_i \angle \theta'$, $F_2 \angle \beta$ be $F_d \angle \theta$, and $F_3 \angle Y$ be $e_s$ which can be shown to be $(l_c A_1 A_2/2) [\cos(F_i - F_d) + (\theta' - \theta)]$ where $l_c A_1 A_2/2$ is referred to as the phase detector constant $K_D$. When the phase of the input signal is not changing $F_i = F_d = F_r$ allowing $\theta$ to approach $\theta'$ in value and $e_s$ to approach zero. When the phase of the input signal is slowly changing the deviation of $F_i$ is $\Delta F_i$ which is $(\Delta \theta/\Delta t)$. The phase of $F_d$ will lag behind the phase of $F_i$ producing the dynamic tracking error which is a function of loop bandwidth.

An example of the type of mixer used as down mixer 40, up mixer 20 and phase detector 14 is a biphase modulator referred to in the communication art as a balanced modulator. This device has a fixed phase shift of 90°, which has no effect on its performance. The above described relationships assume that this 90° phase shift occurs throughout. A mixer as used as a phase detector would also have a small amount of offset due to non-perfect balance which is a function of temperature. This error is generally insignificant.

It will occur to those skilled in the art that other arrangements of both dividers and multipliers utilizing the principles of frequency and phase division and phase multiplication as described herein, may be employed in accordance with the present invention. It can also be shown that the meter, constructed in accordance with the present invention, provides instantaneous phase measurement rather than N period averaging while prior art devices provide only average phase. The device of the present invention gives instantaneous phase at the time of arrival of the zero crossing of the signal where phase is to be measured. This can be done where the rate of shift in phase or rate of change of phase error from the input signal, as compared to the reference signal, is ten parts in a million. That is, for a signal derived from a source moving with respect to the local reference and having a frequency of 10 megaHertz in which there is a 100 Hertz doppler shift, a meter constructed in accordance with the present invention provides instantaneous phase measurement. For example, to measure the phase shift of a 10 megaHertz signal to an accuracy of 1 nanosecond, a clock is provided at 10 megaHertz, N is made to be 100 and readouts of the counter will occur every ten microseconds at the zero crossings of the input signal. This provides instantaneous phase measurement for a single cycle of the input signal. This apparatus is particularly suitable in the measurement of propagation delay in a moving target whose rate of change would make significant errors during N period averaging.

What is claimed is:

1. In an apparatus for measuring the difference in phase between an input signal and a periodic reference the combination comprising:
   means for expanding the phase of said input signal applied thereto by a given amount,
   means coupled to said expanding means for altering the frequency and phase of said expanded input signal by dividing the frequency and phase of said expanded signal by said given amount for generating a first divided signal,
   means for altering the phase and frequency of said reference signal applied as an input thereto by dividing the frequency and phase of said reference signal by said given amount for generating a second divided signal, and
   phase measuring means responsive to said first and second divided signals and said reference signal applied as an input thereto for generating an output signal manifesting the difference in phase between said first and second divided signals, the difference in phase between said first and second divided signals manifesting the difference in phase between said input signal and said reference signal.

2. The combination of claim 1 wherein said phase measuring means includes:
   a counter responsive to said reference signal for counting the periods of said reference applied thereto, and gating means for passing said reference signal to said counter, said gating means being enabled by said second divided signal at a given point on the waveform thereof and disabled by said first divided signal at a given point on the waveform thereof.

3. In an apparatus for measuring the difference in phase between an input signal and a periodic reference signal, the combination comprising:
   phase measuring means responsive to said reference signal applied thereto for generating an output signal manifesting the difference in phase between a first signal input thereto and a second signal input thereto,
   a phase lock loop responsive to said input signal applied thereto and including a voltage controlled oscillator whose output has a given frequency harmonically related to said input signal, at least one integral divider and at least one multiplier for altering the phase of the voltage controlled oscillator output solely by dividing said output phase by the divisor of said divider while altering the frequency of said voltage controlled oscillator output by both dividing the frequency by said divisor and multiplying said frequency by an integer equal to said divisor such that the frequency and phase of said divided and multiplied signal is substantially the same as said input signal then being applied to said phase lock loop,
   a second integral divider responsive to said reference signal applied as an input thereto for altering the phase and frequency of said reference signal by dividing said reference signal by said integer, and
   means for applying said divided voltage controlled oscillator output signal as said first signal input to said phase measuring means, and said divided reference signal as said second signal input to said phase measuring means.

4. The combination of claim 1 wherein said one multiplier includes first mixing means for mixing the divided voltage controlled oscillator output with a third signal input, and signal deriving means for deriving said third signal input from said reference signal.

5. The combination of claim 4 wherein said signal deriving means includes second mixing means for mixing the reference signal with said divided reference signal to produce said third signal input.

6. The combination of claim 3 wherein said phase measuring means includes:
   a counter responsive to said reference signal for counting the periods of said reference signal applied thereto, and
   gating means for passing said reference signal to said counter, said gating means being enabled by said second signal input at a given point on the waveform thereof and disabled by said first signal input at a given point on the waveform thereof, the number of reference signal periods accumulated in said counter manifesting the phase angle between said first and second signal inputs.

7. In an apparatus for measuring the difference in phase between a periodic inputsignal having a given repetition rate and a periodic reference signal, the combination comprising:
   signal deriving means responsive to said input signal for deriving as an output thereof a signal whose repetition rate is the same as that of said periodic input signal and whose phase is a multiple factor of said periodic input signal,
   means responsive to said derived output signal for dividing the frequency and phase of said derived output signal by an amount equal to said multiple factor for generating a first divided output signal,
   means for dividing by an amount equal to said multiple factor the phase and frequency of said reference signal for generating a second divided output signal such that the repetition rate thereof is the same as said first divided output signal,
   phase measuring means for generating an output signal manifesting the difference in phase between first and second signal inputs thereto, and
   input means for applying said first divided signal as said first signal input to saidd phase measuring means and said second divided signal as said second signal input to said phase measuring means, the difference in phase between said first and second divided signals manifesting the difference in phase between said periodic input and reference signals.

8. The combination of claim 7 wherein said signal deriving means includes,
   a phase detector for generating an error signal manifesting the difference in phase between a first signal input thereto and a second signal input thereto,
   a voltage controlled oscillator for generating as an output thereof said derived signal in response to said error signal applied as an input thereto,
   first mixing means for mixing said first divided signal with a third signal input thereto for providing an output signal having a phase and repetition rate substantially the same as said periodic input signal, and
   input means for applying said periodic signal as said first signal input and said mixing means output signal as said second signal input 9. The combination of claim 8 further including means for generating said third signal as an output thereof including second mixing means for mixing a fourth signal input with a fifth signal input, and
second input means for applying said second divided output signal as said fourth signal input and said reference signal as said fifth signal input.

10. In combination:
1. A phase lock loop including:
   a. a voltage controlled oscillator responsive to an error signal applied thereto for generating an output signal whose repetition rate is the same as a periodic input signal applied to said loop and whose phase is a multiple of the phase of said periodic input signal,
   b. first dividing means for dividing the phase and repetition rate of said voltage controlled oscillator output signal applied as an input thereto by a factor equal to said multiple,
   c. multiplying means for multiplying solely the repetition rate of said divided voltage controlled oscillator output signal applied as an input thereto, and
   d. a phase detector for generating said error signal manifesting the difference in phase between said periodic input signal and said multiplied signal,
2. second dividing means responsive to a reference input signal having a reference phase and repetition rate the same as said periodic input signal repetition rate, and
3. phase measuring means responsive to said first and second divided signals applied as inputs thereto for generating an output signal manifesting the difference in phase between said first and second divided signals which manifest the difference in phase between said periodic input signal and said reference signal.

* * * * *